(12) United States Patent
Imanishi (10) Patent No.: US 6,746,364 B2
(45) Date of Patent: Jun. 8, 2004

(54) TOROIDAL-TYPE CONTINUOUSLY VARIABLE TRANSMISSION

(75) Inventor: Takashi Imanishi, Kanagawa (JP)

(73) Assignee: NSK Ltd., Tokyo (JP)

( * ) Notice: Subject to any disclaimer, the term of this patent is extended or adjusted under 35 U.S.C. 154(b) by 24 days.

(21) Appl. No.: 10/151,895

(22) Filed: May 22, 2002

(65) Prior Publication Data

US 2002/0187876 A1 Dec. 12, 2002

(30) Foreign Application Priority Data

May 23, 2001 (JP) .................................... P.2001-153535

(51) Int. Cl.[7] ............................................. F16H 15/38
(52) U.S. Cl. ................................ 476/8; 476/40; 476/46
(58) Field of Search ............................... 476/8, 40, 42, 476/46

(56) References Cited

U.S. PATENT DOCUMENTS

| 6,132,331 A | * | 10/2000 | Imanishi et al. | ............... 476/10 |
| 2002/0037787 A1 | * | 3/2002 | Imanishi | ...................... 476/40 |
| 2002/0039948 A1 | * | 4/2002 | Ooyama | ...................... 476/40 |

FOREIGN PATENT DOCUMENTS

| JP | 4-48351 | 11/1992 |
| JP | 11-201250 | 7/1999 |
| JP | 2001-32899 | 2/2001 |
| JP | 2001-124164 | 5/2001 |

* cited by examiner

Primary Examiner—William C. Joyce
(74) Attorney, Agent, or Firm—Sughrue Mion, PLLC (57) ABSTRACT

A toroidal-type continuously variable transmission includes an oil supply passage formed in a trunnion, for lubricating bearing parts supporting power rollers. The oil supply passage is structured by a groove formed in the inner surface of the trunnion and a plate-shaped cover member for covering the groove.

3 Claims, 6 Drawing Sheets

PRIOR ART

FIG.3

PRIOR ART

TOROIDAL-TYPE CONTINUOUSLY VARIABLE TRANSMISSION

BACKGROUND OF THE INVENTION

1. Field of the Invention

The present invention relates to a toroidal-type continuously variable transmission which is used in an automobile or in various kinds of industrial machines.

2. Description of the Related Art

Figure 2:
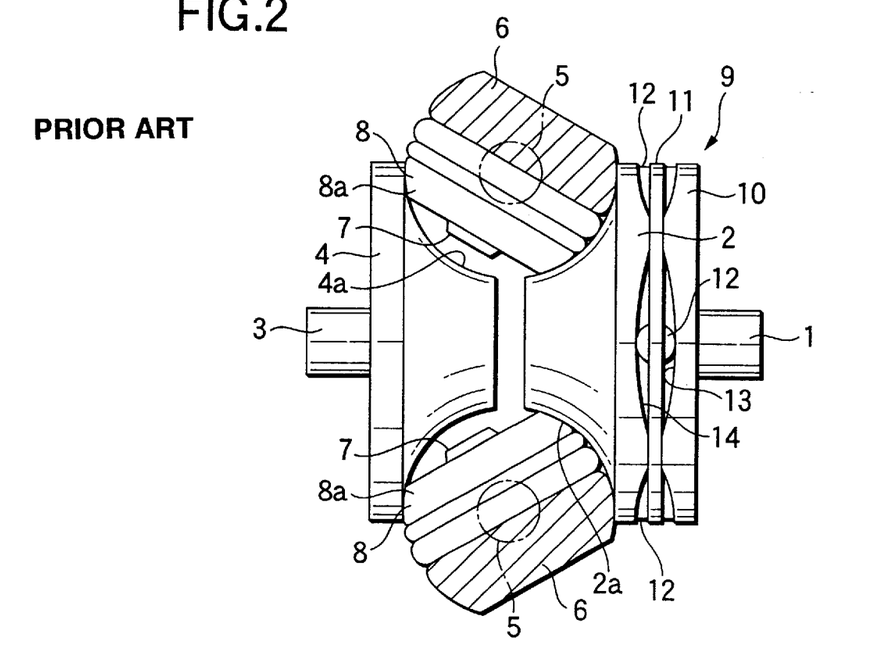
FIG. 2 is a side view of the basic structure of a toroidal-type continuously variable transmission, showing its minimum deceleration state.
Figure 3:
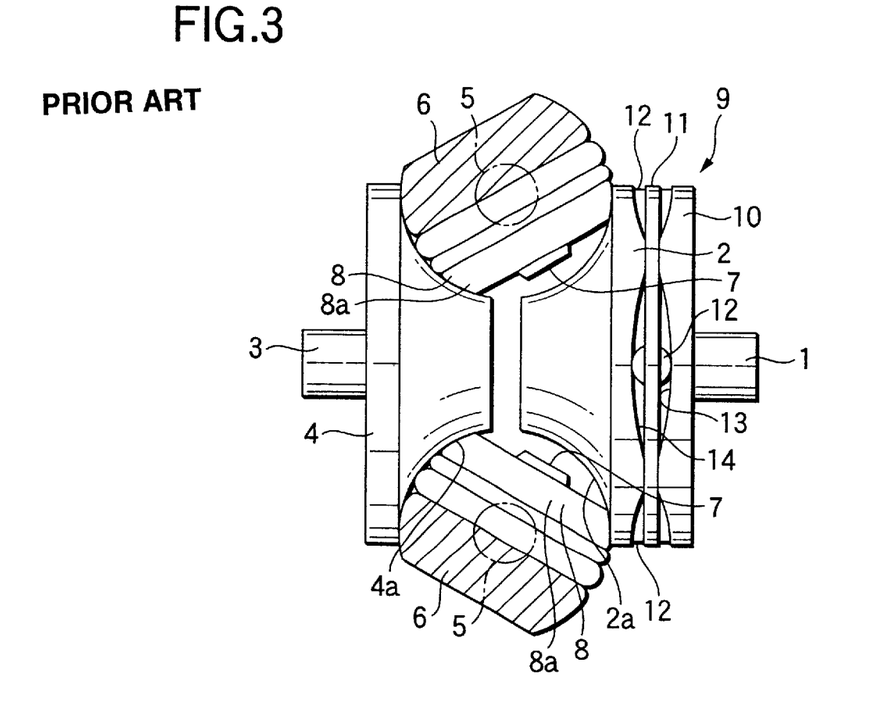
FIG. 3 is a side view of the basic structure of a toroidal-type continuously variable transmission, showing its maximum deceleration-state.

As a transmission for an automobile, for example, there is known such a toroidal-type continuously variable transmission as shown in FIGS. 2 and 3.

This toroidal-type continuously variable transmission comprises an input shaft 1, an input side disk 2 disposed coaxially with the input shaft 1, an output shaft 3 disposed coaxially with the input shaft 1, and an output side disk 4 fixed to the end portion of the output shaft 3. In the interior portion of a casing in which the toroidal-type continuously variable transmission is stored, there are disposed a plurality of (in the present transmission, two) trunnions 6, 6 which can be respectively swung about their associated pivot shafts 5, 5. That is, the pivot shafts 5, 5 are respectively disposed on the outer surfaces of the two end portions of their associated trunnions 6, 6 in such a manner that they are present in the middle portions of the input side and output side disks 2, 4 with respect to the axial direction (in FIGS. 2 and 3, in the right and left direction) of the input side and output side disks 2, 4 so as to be situated in a direction which is perpendicular to the axial direction of the two disks 2, 4 and does not intersect the axes of the two disks 2, 4, that is, at positions twisted with respect to the axes of the two disks 2, 4 (hereinafter, this physical relationship is referred to as "a twisted position").

Also, the base end portions of displacement shafts 7, 7 are supported on the middle portions of the respective trunnions 6, 6; and, in case where the trunnions 6, 6 are swung about their associated pivot shafts 5, 5, the inclination angles of their associated displacement shafts 7, 7 can be changed. Power rollers 8, 8 are respectively supported on the respective displacement shafts 7, 7 so as to be rotatable. These power rollers 8, 8 are held by and between the input side and output side disks 2, 4. That is, the mutually opposing inner surfaces 2a, 4a of the input side and output side disks 2, 4 are respectively formed as concave surfaces which can be obtained when arcs with their respective pivot shafts 5, 5 as the center thereof are respectively rotated about the input shaft 1 and output shaft 3. The peripheral surfaces 8a, 8a of the respective power rollers 8, 8, which are respectively formed as spherical-shaped convex surfaces, are in contact with the inner surfaces 2a, 4a of the input side and output side disks 2, 4.

Between the input shaft 1 and input side disk 2, there is interposed a pressing device 9 of a loading cam type; and, the input side disk 2 is pressed toward the output side disk 4 by the pressing device 9. The pressing device 9 includes a cam plate 10 rotatable together with the input shaft 1 and a plurality of (for example, four) rollers 12 which are respectively held by a retainer 11. In one side surface (in FIGS. 2 and 3, the left side surface) of the cam plate 10, there is formed a cam surface 13 which is a curved surface extending in the circumferential direction of the cam plate 10; and, in the outer surface (in FIGS. 2 and 3, the right side surface) of the input side disk 2 as well, there is formed a cam surface 14 which is similar to the cam surface 13. The plurality of rollers 12 are supported between the two cam surfaces 13 and 14 in such a manner that they can be rotated about their respective axes extending in the radial direction with respect to the axis of the input shaft 1.

In the thus structured toroidal-type continuously variable transmission, in case where the cam plate 10 is rotated due to the rotation of the input shaft 1, the cam surface 13 presses the plurality of rollers 12 against the cam surface 14 of the outer surface of the input side disk 2. As a result of this, the input side disk 2 is pressed against the two power rollers 8, 8 and, at the same time, due to the mutual pressing operations between the pair of cam surfaces 13, 14 and the plurality of rollers 12, the input side disk 2 is rotated. And, the rotational movement of the input side disk 2 is transmitted through the two power rollers 8, 8 to the output side disk 4, thereby rotating the output shaft 3 fixed to the output side disk 4.

When changing the rotation speed ratio (transmission ratio) between the input shaft 1 and output shaft 3, specifically, when reducing the transmission ratio between the input shaft 1 and output shaft 3, the respective trunnions 6, 6 may be swung about their associated pivot shafts 5, 5 and, as shown in FIG. 2, the respective displacement shafts 7, 7 may be inclined in such a manner that the peripheral surfaces 8a, 8a of the power rollers 8, 8 can be respectively contacted with the near-to-center portion of the inner surface 2a of the input side disk 2 and the near-to-outer-periphery portion of the inner surface 4a of the output disk 4.

On the other hand, when increasing the transmission ratio between the input shaft 1 and output shaft 3, the respective trunnions 6, 6 may be swung about their associated pivot shafts 5, 5 and, as shown in FIG. 3, the respective displacement shafts 7, 7 maybe inclined in such a manner that the peripheral surfaces 8a, 8a of the power rollers 8, 8 can be respectively contacted with the near-to-outer-periphery portion of the inner surface 2a of the input side disk 2 and the near-to-center portion of the inner surface 4a of the output disk 4. In case where the inclination angles of the respective displacement shafts 7, 7 are set between the angles shown in FIGS. 2 and 3, there can be obtained an intermediate transmission ratio between the input shaft 1 and output shaft 3.

Figure 4:
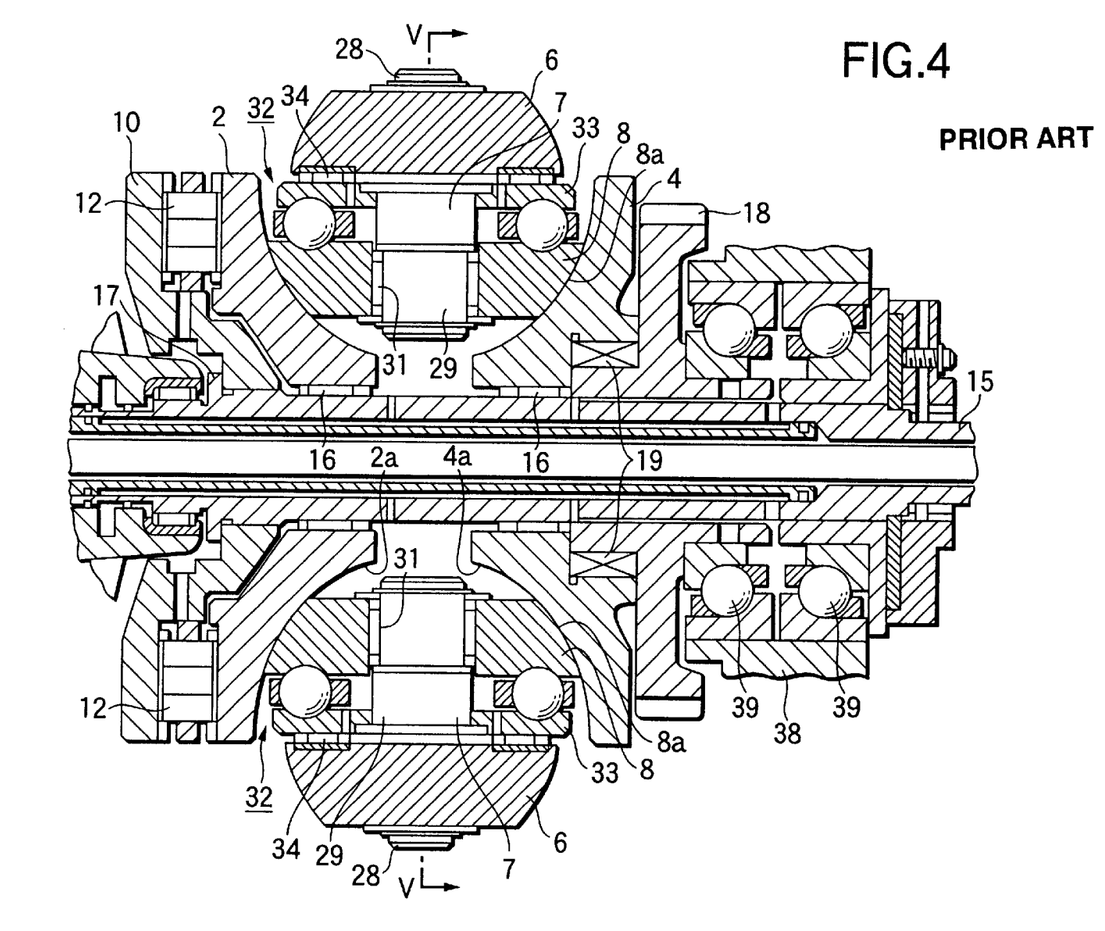
FIG. 4 is a section view of the main portions of a concrete structure of a conventional toroidal-type continuously variable transmission.
Figure 5:
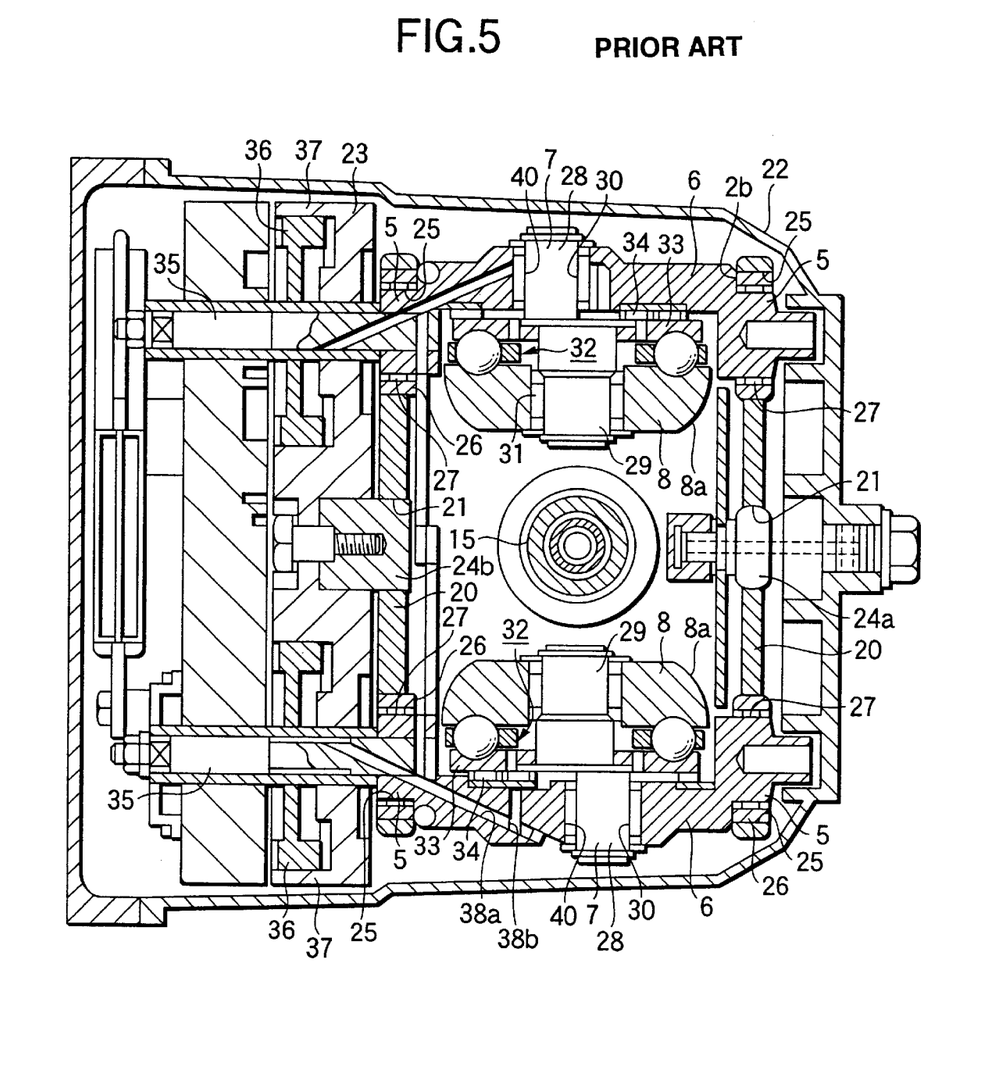
FIG. 5 is a section view taken along the line V—V shown in FIG. 4.

Now, FIGS. 4 and 5 show a more specific structure of a toroidal-type continuously variable transmission.

In this toroidal-type continuously variable transmission, an input side disk 2 and an output side disk 4 are respectively supported on the outer peripheral portion of an input shaft 15 through their associated needle roller bearings 16, 16 in such a manner that they can be rotated. Also, a cam plate 10 is spline engaged with the outer peripheral surface of the end portion (in FIG. 4, the left end portion) of the input shaft 15; and, a collar portion 17 prevents the cam plate 10 from moving in a direction to part away from the input side disk 2. And, the cam plate 10 and rollers 12, 12 cooperate together in constituting a pressing device 9 of a loading cam type which, based on the rotation of the input shaft 15, can rotate the input side disk 2 while pressing the same toward the output side disk 4.

To the output side disk 4, there is connected an output gear 18 by keys 19, 19 in such a manner that the output side disk 4 and output gear 18 can be rotated integrally. The output gear 18 and a gear (not shown) meshingly engaged with the outer gear 18 cooperate together in forming power take-out means which is used to take out the rotational power of the output side disk 4.

Pivot shafts 5, 5, which are respectively disposed on the two end portions of a pair of trunnions 6, 6, are supported on a pair of support posts 20, 20 in such a manner that not only they can be swung but also they can be shifted in the axial direction thereof (in FIG. 4, in the front and back direction; and, in FIG. 5, in the right and left direction). The pair of support posts 20, 20 are respectively formed in a plate shape having sufficient rigidity and respectively include circular holes 21, 21 formed in the central portions thereof. The circular holes 21, 21 are fitted with the outer surfaces of support pins 24a, 24b which are fixedly disposed on the inner surface of the casing 22 and on the side surface of a cylinder case 23 disposed in the interior portion of the casing 22, so that the support posts 20, 20 are supported on the interior portion of a casing 22 in such a manner that the support posts 20, 20 can be swung as well as can be shifted in the axial directions of their respective pivot shafts 5, 5. Also, circular-shaped support holes 25, 25 are respectively formed in the two end portions of each of the support posts 20, 20; and, the pivot shafts 5, 5 disposed on the two end portions of the respective trunnions 6, 6 are respectively supported in their associated support holes 25, 25 by radial needle roller bearings 27, 27 respectively including outer races 26, 26. Thanks to this structure, the respective trunnions 6, 6 are supported on the interior portion of the casing 22 such that they can be swung about their respective pivot shafts 5, 5 as well as can be shifted in the axial directions of their respective pivot shafts 5, 5.

In the middle portions of the respective trunnions 6, 6, there are formed circular holes 40, 40, while displacement shafts 7, 7 are supported in their respective circular holes 40, 40. Each of the displacement shafts 7 includes a support shaft portion 28 and a pivot support shaft portion 29 which are parallel to each other and are eccentric to each other. The respective support shaft portions 28 are swingably supported on the inner sides of their associated circular holes 40 through their associated radial needle roller bearings 30. Also, power rollers 8 are rotatably supported on the outer peripheral portions of the respective pivot support shaft portions 29 through their respective radial needle roller bearings 31.

By the way, the pair of displacement shafts 7, 7 are disposed in such a manner that they have point symmetry (are situated at positions on the 180° opposite positions) with respect to the input shaft 15. Also, the directions of the pivot support shaft portions 29, 29 of the respective displacement shafts 7, 7 eccentric to their respective support shaft portions 28, 28 are set in the same directions (in FIG. 5, in the reversed right and left directions) with respect to the rotational directions of the input side and output side disks 2, 4. Also, the axial directions of the respective pivot support shaft portions 29, 29 are set in directions which are almost perpendicular to the axial direction of the input shaft 15 (in FIG. 4, the right and left direction; and, in FIG. 5, in the front and back direction). Therefore, the respective power rollers 8, 8 are supported in such a manner that they are allowed to shift to a slight degree in the axial direction of the input shaft 15. As a result of this, even in case where the power rollers 8, 8 are shifted slightly in the axial direction of the input shaft 15 due to variations in the dimensional accuracy of the respective composing parts of the transmission or due to the elastic deformation of the parts possibly occurring in the transmission of the power, such shifting motion of the power rollers 8, 8 can be absorbed, which makes it possible to prevent unreasonable forces from being applied to the composing parts of the transmission.

Also, between the outer surfaces of the power rollers 8, 8 and the inner surfaces of the middle portions of the trunnions 6, 6, in the order starting at and from the outer surfaces of the power rollers 8, 8, there are interposed thrust rolling bearings 32, 32 such as thrust ball bearings and thrust bearings 34, 34 for supporting thrust loads to be applied to outer races 33, 33, which will be discussed later. The thrust rolling bearings 32, 32 not only support the thrust-direction loads to be applied to the power rollers 8, 8 but also allow the power rollers 8, 8 to rotate. Each of the thrust rolling bearings 32, 32 includes a plurality of balls, a circular-ring-shaped retainer for holding the balls so as to be rollable, and a circular-ring-shaped outer race 33. The inner race raceways of the respective thrust rolling bearings 32, 32 are formed in the outer surfaces of their associated power rollers 8, while the outer race raceways of the respective thrust rolling bearings 32, 32 are formed in the inner surfaces of their associated outer races 33. Also, the thrust bearings 34, 34 not only support the thrust loads to be applied to the outer races 33, 33 of their associated thrust rolling bearings 32, 32 from their associated power rollers 8, 8 but also allow the pivot support shaft portions 29, 29 and outer races 33, 33 to swing about their associated support shaft portions 28, 28. The thrust bearings 34, 34 shown in FIGS. 4 and 5 are respectively thrust needle roller bearings and, each of the thrust bearings 34, 34 includes a race, a retainer and a needle. The race and retainer are combined together in such a manner that they can be shifted slightly in the rotational direction thereof. In a state where the races are contacted with the inner surfaces of their respective trunnions 6, 6, the races are held between the inner surfaces of their respective trunnions 6, 6 and the outer surfaces of the outer races 33, 33.

Also, drive rods 35, 35 are respectively connected to the one-end portions (in FIG. 5, the left end portions) of their associated trunnions 6, 6, while drive pistons 36 are fixedly secured to the outer peripheral surfaces of the middle portions of their associated drive rods 35, 35. The respective drive pistons 36, 36 are fitted oil-tight into their associated drive cylinders 37, 37 which are disposed in the interior portion of the cylinder case 23. Further, between the input shaft 15 and a support wall 38 formed in the interior portion of the casing 22, there are interposed a pair of rolling bearings 39, 39; and thus the input shaft 15 is rotatably supported in the interior portion of the casing 22.

In the thus structured toroidal-type continuously variable transmission, the rotation of the input shaft 15 is transmitted through the pressing device 9 to the input side disk 2. And, the rotation of the input side disk 2 is transmitted through the pair of power rollers 8, 8 to the output side disk 4 and further the rotation of the output side disk 4 is taken out by the output gear 18. To change the rotation speed ratio between the input shaft 15 and output gear 18, the pair of drive pistons 36, 36 may be shifted in the mutually opposite directions. That is, with the shifting operations of the drive pistons 36, 36, the pair of trunnions 6, 6 are shifted in the mutually opposite directions. For example, the power roller 8 shown on the lower side in FIG. 5 is shifted to the right in FIG. 5, whereas the power roller 8 shown on the upper side in FIG. 5 is shifted to the left in FIG. 5. This changes the direction of a tangential-direction force acting on the contact portions between the peripheral surfaces 8a, 8a of the power rollers 8, 8 and the inner surfaces 2a, 4a of the input side and output side disks 2, 4. With this change in the direction of the tangential-direction force, the respective trunnions 6, 6 are swung in the mutually opposite directions in FIG. 4 about their associated pivot shafts 5, 5 which are pivotally supported on the support posts 20, 20. As a result of this, as shown in FIGS. 2 and 3 the contact positions between the peripheral surfaces 8a, 8a of the power rollers 8, 8 and the inner surfaces 2a, 4a of the input side and output side disks 2, 4 are changed, thereby changing the rotation speed ratio between the input shaft 15 and output gear 18.

By the way, in case where, in the power transmission operation, the composing parts of the transmission are elastically deformed and the power rollers 8, 8 are thereby shifted in the axial direction of the input shaft 15, the displacement shafts 7, 7 pivotally supporting these power rollers 8, 8 are slightly swung about their respective support shaft portions 28, 28. As a result of this swing, the outer surfaces of the outer races 33, 33 of the thrust rolling bearings 32, 32 and the inner surfaces of their associated trunnions 6, 6 are shifted with respect to each other. Since, between the outer surfaces of the outer races and the inner surfaces of the trunnions, there exist the thrust bearings 34, 34, a force required for them to shift with respect each other is small. Therefore, there may be necessary only a small force to change the inclination angles of the displacement shafts 7, 7 in the above-mentioned manner.

In the case of a toroidal-type continuously variable transmission which is structured and operates in the above-mentioned manner, it is necessary to feed lubricating oil into the bearing portions of the transmission such as the radial needle roller bearings 31 and thrust rolling bearings 32 for supporting the power rollers 8, 8, which respectively exist in the combined portions of the trunnions 6, 6, displacement shafts 7, 7 and power rollers 8, 8. The reason for this is as follows: that is, when the toroidal-type continuously variable transmission is in operation, the power rollers 8, 8 rotate at high speeds while receiving large loads; and, therefore, to secure the durability of the bearings such as the radial needle roller bearings 31 and thrust rolling bearings 32, it is necessary to feed a sufficient amount of lubricating oil to the respective bearing portions including these bearings 31, 32.

In view of the above, in the case of the structure shown in FIGS. 4 and 5, oil supply holes 38a, 38b which are connected continuously with each other are formed in the interior portions of the respective trunnions 6, 6. And, working oil existing in the interior portion of the drive cylinders 37, 37 is fed as lubricating oil into the oil supply holes 38a, 38b from the low-pressure chamber side of the respective drive cylinders 37, 37. The thus-fed lubricating oil is jetted out from the downstream end of the oil supply hole 38b and is then fed into between the inner surface of the trunnion 6 and the outer surface of the outer race 33 of the thrust rolling bearing 32. In this manner, the lubricating oil lubricates the bearing portions such as the radial needle roller bearings 31 and thrust rolling bearings 32. By the way, the structures and operations of the bearing portions are disclosed in more detail in JP-B-4-48351U.

Figure 6:
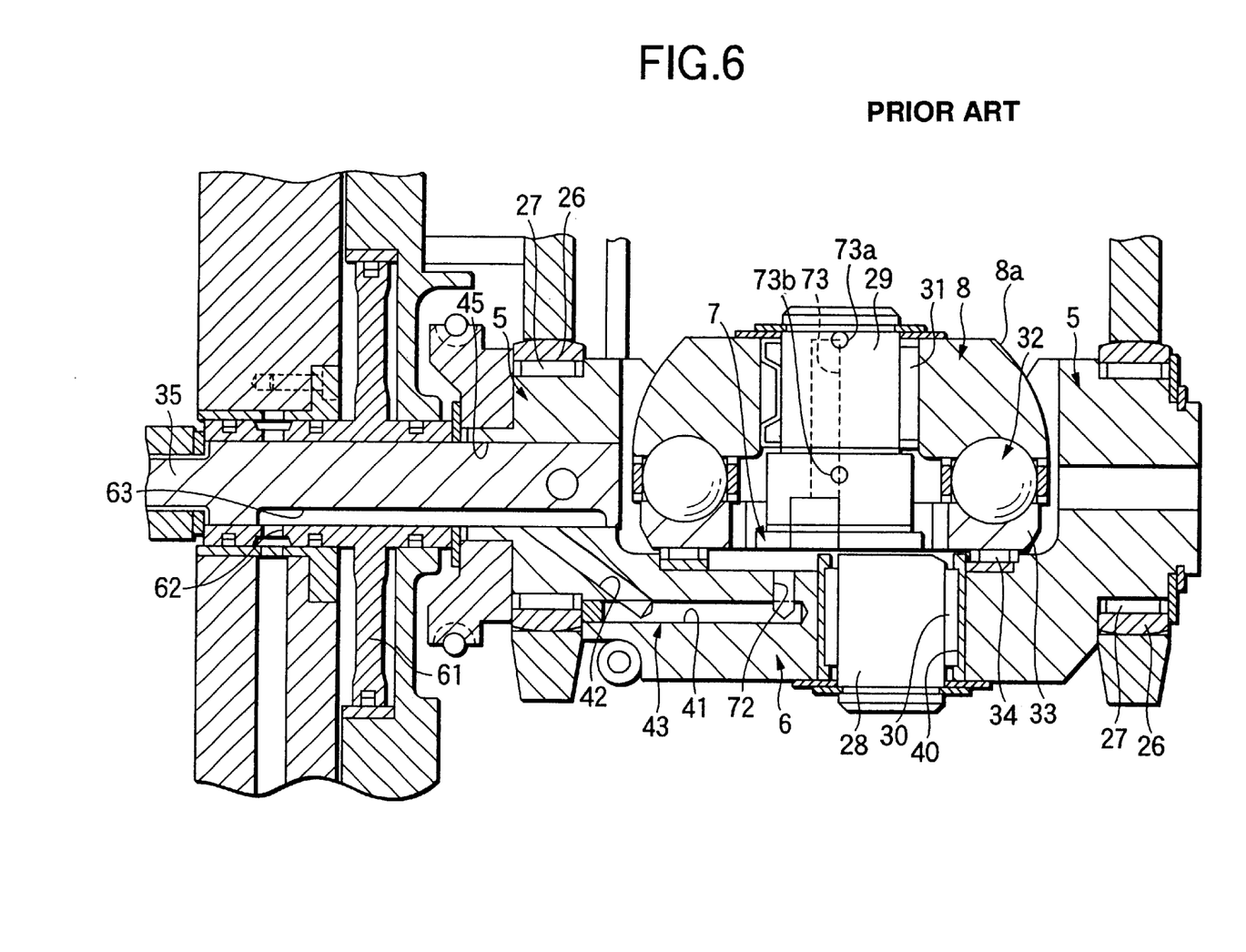
FIG. 6 is a section view of a trunnion part of a conventional toroidal-type continuously variable transmission; and, FIGS. 7A to 7C show a configuration of the cover member of the present invention.

Also, as a structure for feeding lubricating oil into the bearing portions such as the radial needle roller bearings 31 and thrust rolling bearings 32, conventionally, there is known such a structure as shown in FIG. 6.

In the present conventional toroidal-type continuously variable transmission, an oil supply passage 43 formed in the interior portion of the trunnion 6 connects together an oil supply hole 41, an oil supply hole 42, and an oil supply oil 72 in series. of these supply holes, the oil supply hole 41 is formed in parallel to the center axes of the pair of pivot shafts 5, 5 disposed in the two end portions of the trunnion 6, while the oil supply hole 41 terminates in the interior of the middle portion of the trunnion 6. The oil supply hole 41 can be formed using a drilling machine: that is, the oil supply hole 41 can be formed by inserting the drilling blade of the drilling machine into the trunnion 6 toward the circular hole 40 from one end face of the trunnion 6 in the axial direction thereof; and, after the oil supply hole 41 is formed, the opening thereof is closed by a plug.

On the other hand, in the case of the oil supply hole 42, one end thereof is opened on the inner peripheral surface of a penetration hole 45 formed in the central portion of one (left side) pivot shaft 5 of the pair of pivot shafts 5, 5, while part of the oil supply hole 42 is formed so as to be in communication with the oil supply hole 41. And, in the case of the oil supply hole 72, one end thereof is opened on the inner surface of the middle portion of the trunnion 6 and also the other end portion thereof is formed so as to communicate with the oil supply hole 41. Also, the respective other ends of the oil supply holes 42 and 72 terminate in the interior of the middle portion of the trunnion 6. These oil supply holes 42 and 72 can be formed using a drilling machine: that is, the former can be formed by inserting the drilling blade of the drilling machine into the trunnion 6 from the opening side of the penetration hole 45, while the latter can be formed by inserting the drilling blade into the trunnion 6 from the inner surface of the middle portion of the trunnion 6.

The conventional toroidal-type continuously variable transmission, in the assembled state thereof, includes a hydraulic cylinder which serves as an actuator for shifting the trunnion 6 in the axial direction of the pivot shafts 5, 5. A drive rod 35, which forms the present hydraulic cylinder, includes an oil supply groove 63 formed in a portion (in FIG. 6, the lower portion) of the peripheral surface thereof so as to extend in parallel to the axis of the drive rod 35, one end (in FIG. 6, the left end portion) of the oil supply groove 63 terminates in the middle portion of the drive rod 35, and the present end portion of the oil supply groove 63 is in communication with a supply opening 62 for the lubricating oil. And, the other end of the oil supply groove 63 terminates in the intermediate portion of the leading end portion of the drive rod 35 that is present within the penetration hole 45. The end portion of the oil supply groove 63, which terminates in the intermediate portion of the leading end portion of the drive rod 35, is disposed opposed to the opening of the oil supply hole 42, thereby allowing the oil supply groove 63 to communicate with the oil supply hole 42. The oil supply groove 63, except for the two end portions thereof, is covered by the cylindrical portion of the base portion of a drive piston 61 fixed to the inner peripheral surface of the penetration hole of the pivot shaft 5 and to the outer peripheral surface of the drive rod 35.

Further, an oil supply hole 73 is formed in the interior portion of the pivot support shaft portion 29 of the displacement shaft 7. The upstream side end portion of the oil supply hole 73 is opened in the portion of the inside end face of the pivot support shaft portion 29 that is eccentric to the outer peripheral surface of the support shaft portion 28, and is opposed to an opening of the downstream side end portion of the oil supply hole 72. And, the downstream side ends of branch nozzle holes 73a, 73b, which are branched from the oil supply hole 73, are respectively opened in the portions of the outer peripheral surface of the pivot support shaft portion 29 that are opposed to the inside diameter side of the thrust rolling bearing 32 and radial needle roller bearing 31.

When the present toroidal-type continuously variable transmission is in operation, lubricating oil is fed from the supply opening 62 into the oil supply groove 63 using oil supply means such as an oil supply pump (not shown). And, the lubricating oil is fed through the oil supply holes 42, 41, 72 into the oil supply hole 73 as well as into between the inner surface of the trunnion 6 and the outer surface of the outer race 33. The thus fed lubricating oil is then fed into the respective bearing portions including the radial needle roller bearing 31, thrust rolling bearing 32, radial needle roller bearing 30 and thrust bearing 34, so that the lubricating oil lubricates these bearing portions.

By the way, in the conventional structures shown in FIGS. 4 to 7, the oil supply hole 38a (FIG. 5) or oil supply hole 42 (FIG. 6) is inclined with respect to the axis of the pivot shaft 5 disposed on the end portion of the trunnion 6. That is, in either of the structures, on the extension of the upstream side opening of the oil supply hole 38a or oil supply hole 42, there exists the opening of the penetration hole 45 formed in the central portion of the pivot shaft 5. The reason for this is that, in either of the structures, the oil supply hole 38a or oil supply hole 42 is formed by inserting the drilling blade of the drilling machine into the trunnion 6 from the opening side of the penetration hole 45.

However, in the thus structured conventional toroidal-type continuously variable transmissions, when the interior portion of the trunnion 6 is worked by drilling so as to form the oil supply holes 38a, 38b or oil supply holes 42, 41, 72, there arise the following problems: that is, (1) Since the oil supply holes 38a, 38b or oil supply holes 42, 41, 72 are formed by drilling, the working cost thereof is high and thus the cost of the whole transmission is high. Especially, in the case of working the oil supply holes 38a, 42, in the start stage of the working by drilling, because the drilling blade must be strongly butted against the inner peripheral surface of the penetration hole 45 at a small inclination angle, not only the drilling or cutting operation of the trunnion 6 using the drilling blade must be executed slowly but also the durability of the drilling blade is shortened, which results in the increased working costs of the oil supply holes 38a, 42.

(2) In the drilling working of the oil supply holes 38a, 38b or oil supply holes 42, 41, 72, burrs are easy to be left in the respective holes. These burrs, when they are treated thermally, are hardened; and therefore, when the toroidal-type continuously variable transmission is in operation, the hardened burrs drop down due to the flow of the lubricating oil and bite into the respective bearing portions and traction power transmission parts of the transmission to cause pressure marks thereon, which gives rise to the lowered durability of the transmission. Such burrs are easy to occur especially in the mutually intersecting portions of the drilled holes.

(3) A thrust force of about 6 tons, which is applied to the power roller 8, is applied to the trunnion 6 and this thrust force is received by the two ends of the trunnion 6, thereby causing a large bending stress in the trunnion 6. In case where the trunnion 6, which is held in the above state, includes such a portion as the drilled hole, stresses concentrate on this portion to thereby lower the strength of the trunnion 6; and, in a serious case, there is a fear that the trunnion 6 can be broken.

SUMMARY OF THE INVENTION

The present invention aims at eliminating the drawbacks found in the above-mentioned conventional toroidal-type continuously variable transmissions. Accordingly, it is an object of the invention to provide a toroidal-type continuously variable transmission which can enhance the strength of a trunnion, can prevent the trunnion from being lowered in durability, and can reduce the working cost of the trunnion and thus the cost of the whole toroidal-type continuously variable transmission.

In attaining the above object, according to the invention, there is provided a toroidal-type continuously variable transmission, including: an input shaft supported to be rotatable; an input side disk including an inner surface having a section thereof formed as an arc-shaped concave surface and rotatable together with said input shaft; an output side disk including an inner surface opposed to said inner surface of said input side disk and having a section formed as an arc-shaped concave surface, disposed coaxially with said input side disk, and supported so as to be rotatable with respect to said input side disk; a trunnion disposed to be swingable about a pivot shaft situated at a twisted position with respect to center axes of said input side and output side disks; a displacement shaft supported on said trunnion; a plurality of power rollers respectively including peripheral surfaces formed as spherical-shaped convex surfaces, supported on said displacement shaft to be rotatable, and held by and between said input side and output side disks; a thrust rolling bearing positioned between the outer surfaces of said power rollers and the inner surface of said trunnion; and, an oil supply passage formed in said trunnion, wherein said oil supply passage is structured by a groove formed in the inner surface of said trunnion and a cover member for covering said groove.

According to the invention, lubricating oil is supplied through the oil supply passage formed in the trunnion to the bearing portions of the transmission such as radial bearings and thrust rolling bearings for supporting the power rollers. And, since the oil supply passage is structured by a groove and a cover member, when compared with the conventional toroidal-type continuously variable transmission, there is eliminated the need to form a hole in the interior portion of the trunnion by drilling, thereby being able to relieve the concentration of stresses. Thanks to this, the strength of the trunnion with respect to bending stresses can be enhanced over the conventional toroidal-type continuously variable transmission; and, in the case of a trunnion having the same strength as a trunnion used in the conventional toroidal-type continuously variable transmission, the size and weight of the whole trunnion can be reduced. Also, because there is avoided the production of burrs which would otherwise be caused by the drilling operation, degradation in the durability of the trunnion due to such burrs can be prevented. Further, such elimination of the high-cost drilling operation can reduce the working cost of the trunnion.

Also, according to the invention, since the cover member serves also as the race of the thrust bearing, the number of parts can be reduced, which makes it possible to reduce the manufacturing cost of the trunnion.

Further, according to the invention, because the groove constituting the oil supply passage is formed by metal forming using plastic deformation, the working cost of the trunnion can be reduced further and, at the same time, the portions of the trunnion in the periphery of the groove are hardened through the groove working to thereby be able to enhance the strength of the trunnion.

DETAILED DESCRIPTION OF THE PREFERRED EMBODIMENTS

Now, description will be given below of an embodiment of a toroidal-type continuously variable transmission according to the invention with reference to the accompanying drawings. By the way, in FIG. 1, the same composing elements thereof as in FIG. 6 are given the same designations and thus the description thereof is simplified here.

Figure 1:
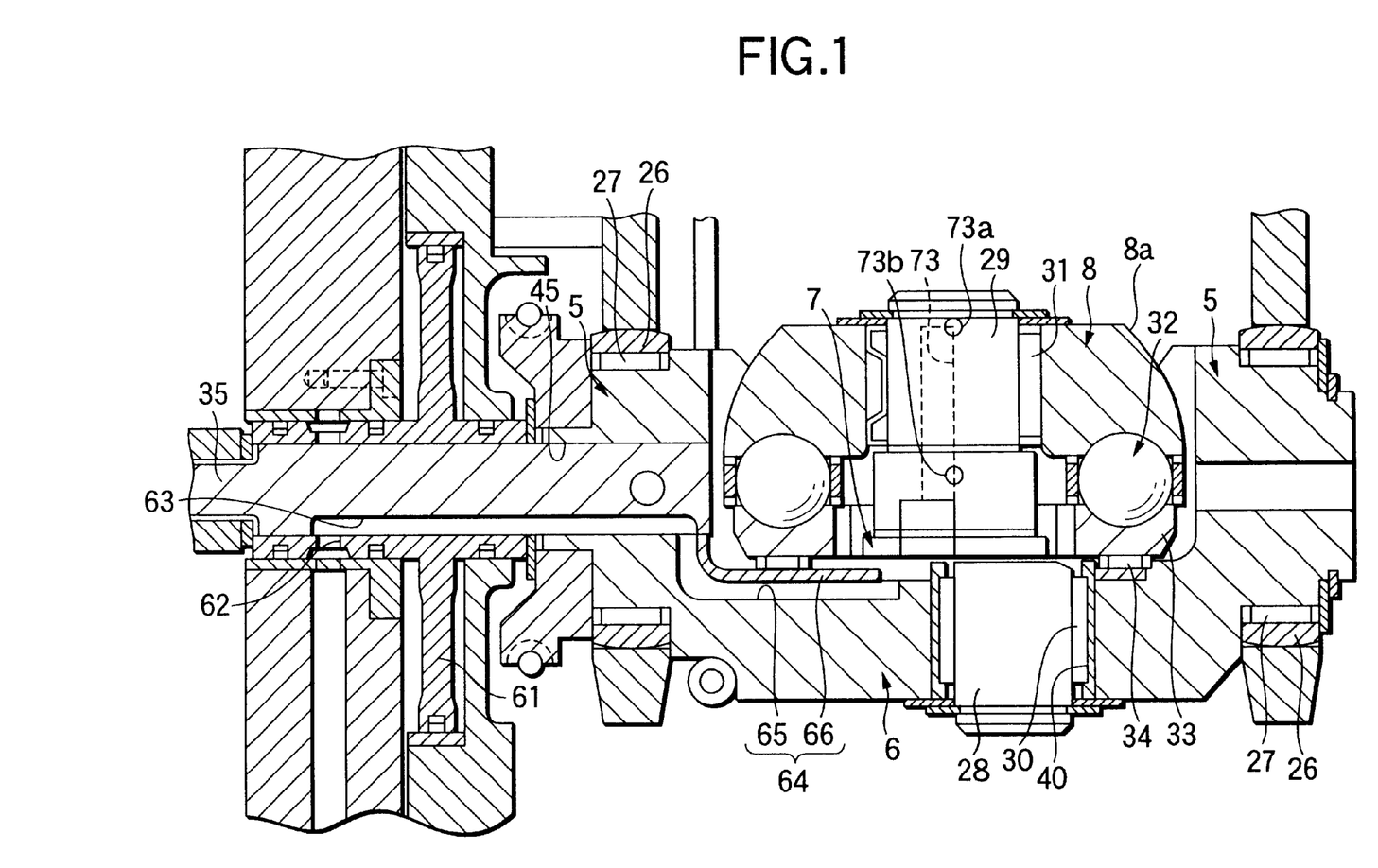
FIG. 1 is a section view of a trunnion part of a toroidal-type continuously variable transmission according to an embodiment of the invention.
Figure 7A:
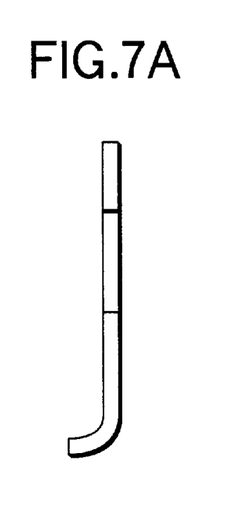
Figure 7B:
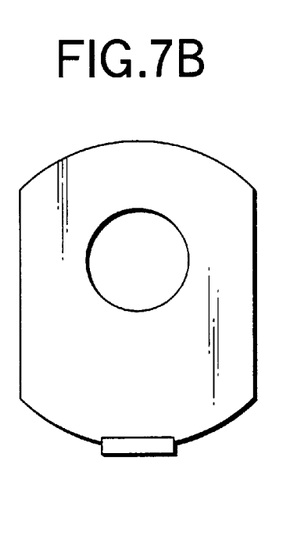
Figure 7C:
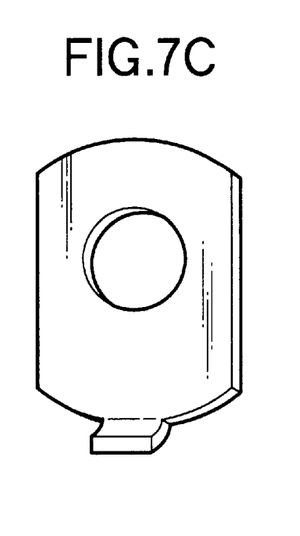

In a toroidal-type continuously variable transmission according to the present embodiment, as shown in FIG. 1, an oil supply passage 64 formed in a trunnion 6 is structured by a groove 65 formed in the inner surface of the trunnion 6 and a plate-shaped cover member 66 for covering the groove 65. One end of the groove 65 extends up to a penetration hole 45 formed in one pivot shaft 5 and is connected to one end of an oil supply opening 63. Also, the other end of the groove 65 extends up to the vicinity of a displacement shaft 7 so that lubricating oil can be supplied to an oil supply hole 73 formed in the displacement shaft 7. The cover member 66 not only covers the groove 65 except for the portion of the groove 65 that is opposed to the oil supply groove 63 and the end portion of the groove 65 on the displacement shaft side, but also serves as a race of a thrust bearing 34 interposed between the trunnion 6 and the outer race 33 of a thrust rolling bearing 32. In this connection, the cover member 66 is made of a material cured after performing a heat treatment (through hardening) of steel (e.g. tool steel), and has a configuration shown in FIGS. 7A to 7C.

In the present toroidal-type continuously variable transmission, lubricating oil, which is supplied from a supply opening 62 into the oil supply groove 63, is fed through the oil supply groove 63 and oil supply passage 64 into the oil supply hole 73 as well as into between the inner surface of the trunnion 6 and the outer surface of the outer race 33. The thus fed lubricating oil is then fed into the respective bearing portions of the transmission including a radial needle roller bearing 31, a thrust rolling bearing 32, a radial needle roller bearing 30 and a thrust bearing 34 to thereby lubricate these bearing portions.

In the thus structured toroidal-type continuously variable transmission, since the oil supply passage 64 of the trunnion 6 is structured by the groove 65 and the cover member 66 for covering the groove 65, when compared with the conventional toroidal-type continuously variable transmissions, there is eliminated the need to form a hole in the interior portion of the trunnion 6 by drilling. Thanks to this, concentration of stresses can be relieved and thus, when compared with the conventional toroidal-type continuously variable transmissions, the strength of the trunnion with respect to the bending stress can be enhanced. Therefore, in the case of a trunnion having the same strength, the size and weight of the whole of the trunnion can be reduced. Also, because there is avoided the production of burrs involved with the drilling operation, degradation of the durability of the trunnion possibly caused by such burrs can be prevented. Further, since there can be eliminated the drilling operation that is high in cost, the working cost of the trunnion can be reduced.

Also, because the cover member 66 serves also as the race of the thrust bearing 34, the number of parts can be reduced, which makes it possible to reduce the manufacturing cost of the trunnion further.

Further, since the groove 65 of the trunnion 6 can be formed by metal forming using plastic deformation such as by forging, the working cost of the trunnion can be reduced still further. Also, because the peripheral portions of the groove 65 are hardened through the plastic deformation, the strength of the trunnion 6 can be enhanced.

By the way, even in case where there exists a slight clearance between the groove 65 and cover member 66, since the leaked portion of the lubricating oil is introduced to and used in the traction surface between the peripheral surface 8a of the power roller 8 and the input disk 2 or output disk 4, the lubricating oil can never be wasted.

On the other hand, in case where there is interposed a seal member between the groove 65 and cover member 66 to thereby prevent the leakage of the lubricating oil, a sufficient amount of lubricating oil can be positively supplied to the above-mentioned bearing portions.

As has been described heretofore, according to the toroidal-type continuously variable transmission of the invention, since the oil supply passage is structured by the groove and cover member, formation of holes using drilling operations can be eliminated, which can enhance the strength of the trunnion, can prevent the trunnion from being lowered in durability, and can reduce the working cost of the trunnion and thus the cost of the whole toroidal-type continuously variable transmission.

Also, according to the present toroidal-type continuously variable transmission, because the cover member serves also as the race of the thrust bearing interposed between the outer race of the thrust rolling bearing and the inner surface of the trunnion, the number of parts can be reduced and also the manufacturing cost of the trunnion can be reduced further.

Further, according to the present toroidal-type continuously variable transmission, since the groove forming the oil supply passage is formed by a metal forming operation using plastic deformation, the working cost of the trunnion can be reduced still further and also the strength of the trunnion can be enhanced due to the hardened peripheral portions of the groove through the metal forming operation.

While only certain embodiments of the invention have been specifically described herein, it will apparent that numerous modifications may be made thereto without departing from the spirit and scope of the invention.

What is claimed is:

1. A toroidal-type continuously variable transmission, comprising:

an input shaft supported to be rotatable;

an input side disk including an inner surface having a section thereof formed as an arc-shaped concave surface and rotatable together with said input shaft;

an output side disk including an inner surface opposed to said inner surface of said input side disk and having a section formed as an arc-shaped concave surface, disposed coaxially with said input side disk, and supported so as to be rotatable with respect to said input side disk;

a trunnion disposed to be swingable about a pivot shaft situated at a twisted position with respect to center axes of said input side and output side disks;

a displacement shaft supported on said trunnion;

a pivot shaft formed on one end of said trunnion;

a plurality of power rollers respectively including peripheral surfaces formed as spherical-shaped convex surfaces, supported on said displacement shaft to be rotatable, and held by and between said input side and output side disks;

a thrust rolling bearing positioned between the outer surfaces of said power rollers and the inner surface of said trunnion; and, an oil supply passage formed in said trunnion, wherein said oil supply passage is structured by a groove formed in the inner surface of said trunnion, one end of the groove extending up to a penetration hole formed in the pivot shaft, and a cover member for covering said groove.

2. The toroidal-type continuously variable transmission according to claim 1, wherein said thrust rolling bearing includes an outer race, wherein said transmission includes a thrust bearing interposed between said outer race of said thrust rolling bearing and the inner surface of said trunnion, and wherein said cover member serves as a race of said thrust bearing.

3. The toroidal-type continuously variable transmission according to claim 1, wherein said groove forming said oil supply passage is formed by metal forming using plastic deformation.

* * * * *